United States Patent [19]

Gershman

[11] Patent Number: 4,522,150
[45] Date of Patent: Jun. 11, 1985

[54] CAT LITTER DISPOSAL HOUSING

[76] Inventor: Leonard Gershman, 10853 Rose Ave., #55, Los Angeles, Calif. 90034

[21] Appl. No.: 619,837

[22] Filed: Jun. 12, 1984

[51] Int. Cl.³ .............................................. A01K 23/00
[52] U.S. Cl. ........................................................ 119/1
[58] Field of Search ........................................... 119/1

[56] References Cited

U.S. PATENT DOCUMENTS

| | | | |
|---|---|---|---|
| 3,227,137 | 1/1966 | Goldman et al. | 119/1 |
| 3,487,814 | 1/1970 | Ingebritsen | 119/19 |
| 4,120,264 | 10/1978 | Carter | 119/1 |
| 4,299,190 | 11/1981 | Rhodes | 119/1 |
| 4,325,822 | 4/1982 | Miller | 119/1 |

Primary Examiner—Hugh R. Chamblee
Attorney, Agent, or Firm—Poms, Smith, Lande & Rose

[57] ABSTRACT

A housing large enough to accommodate a cat has a rounded top and a removable litter tray for a bottom, with the litter tray being clamped to the housing with a plastic sheet over it to receive the litter. A removable drawer-like container having a screen bottom is mounted in the upper portion of said housing. The support for the removable container closes the space between the housing and the removable container on one side but leaves it open on the other side, so that, when the housing is rotated through 360 degrees about a longitudinal axis, the litter flows along the side wall of the housing and into said container. The particulate litter then drops through the screen bottom of said container, and the fecal matter and any agglomerated litter may be disposed of by removing the container with the screen bottom, and dumping the fecal matter into the garbage. The remaining litter drops down to the litter tray at the base of the housing and may be re-used for a period of time. The housing may include a door to permit access by the cat, handles at the top and sides to facilitate lifting and rotating the housing or rolling it over, a filter for purifying air, and a fan for circulating air through the filter.

19 Claims, 10 Drawing Figures

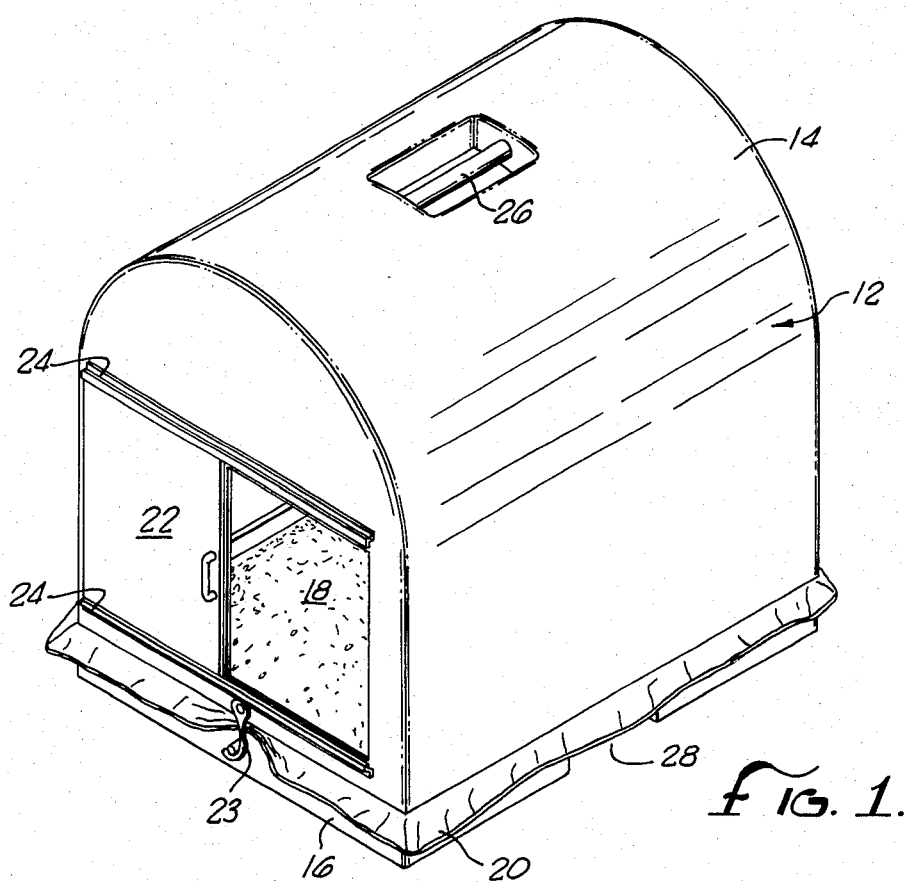
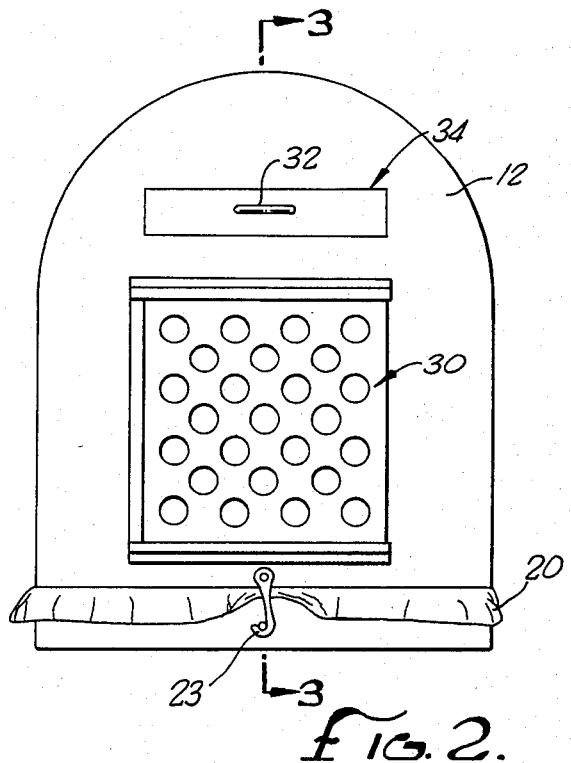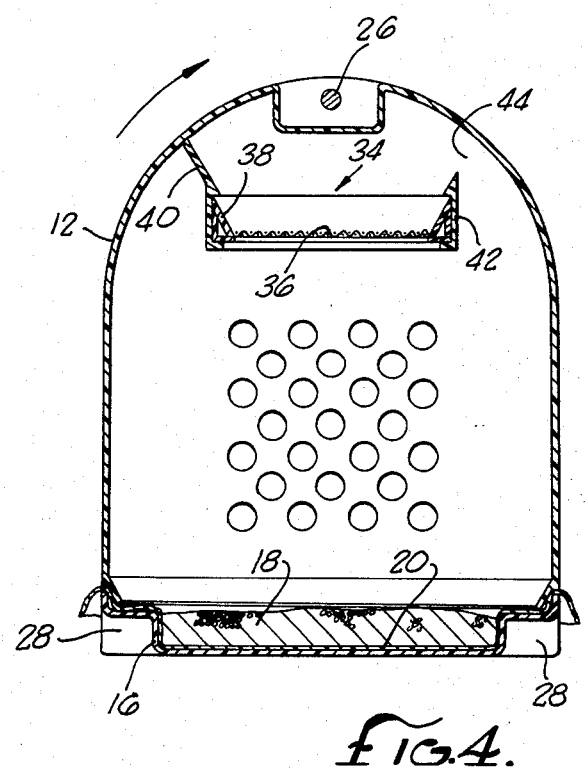

CAT LITTER DISPOSAL HOUSING

FIELD OF THE INVENTION

The present invention relates to litter boxes or housings for cats or similar small animals.

BACKGROUND OF THE INVENTION

When it is necessary to keep pets, such as cats, in the house or apartment, it is customary to provide litter boxes where the cats may urinate and defecate. Arrangements have previously been proposed, for example, see U.S. Pat. No. 4,325,325, for separating solid excrement from the litter, by passing the litter through a screen or the like. However, arrangements such as that shown in the above cited patent are relatively inconvenient to use, and present mess and storage problems.

Accordingly, a principal object of the present invention is to provide a fully enclosed litter box and housing which can also serve as a carrying case or confining enclosure for the cat or other animal.

SUMMARY OF THE INVENTION

In accordance with a broad aspect of the invention, a housing is large enough to accommodate a cat or similar small animal, and a litter tray is removably mounted to form the bottom of the housing. Near the top of the housing is a removable drawer-like container with a screen bottom. This removable container is mounted so that the space between the container and one upper side wall of the housing is closed, but the space between the side of the container and the other upper side wall of the housing is open, so that when the housing is rotated, the litter will flow along the side wall of the housing and into the removable container with the screen bottom. Solid fecal matter or excrement will be retained on the screen while the remaining particulate litter will drop through the screen back to the litter tray at the bottom of the housing.

Other features of the invention which may selectively be included in the apparatus include the following:

1. The upper wall of the housing may be rounded to facilitate rolling the housing over to move the litter from the lower litter tray into the upper removable container, as described above.
2. A suitable sliding door may be provided to give access to the interior of the housing for a cat.
3. Handles may be provided at the top and/or the two sides of the housing to facilitate lifting and easily rotating the housing.
4. An air filter may be provided at one end of the housing.
5. A fan may be provided to move air or to exhaust air through the filter.
6. A handle may be provided for ease in removing the drawer-like removable container with the screen bottom, for the easy disposal of fecal matter and associated agglomerated litter.

Other objects, features and advantages of the invention will become apparent from a consideration of the following detailed description and from the accompanying drawings.

BRIEF DESCRIPTION OF THE DRAWINGS

FIG. 1 is an isometric view of a cat litter disposal housing illustrating the principles of the present invention;

FIG. 2 is an end view of the rear of the housing of FIG. 1;

FIG. 4 is a cross-sectional view taken along lines 4—4 of FIG. 3;

DETAILED DESCRIPTION

Figure 3:
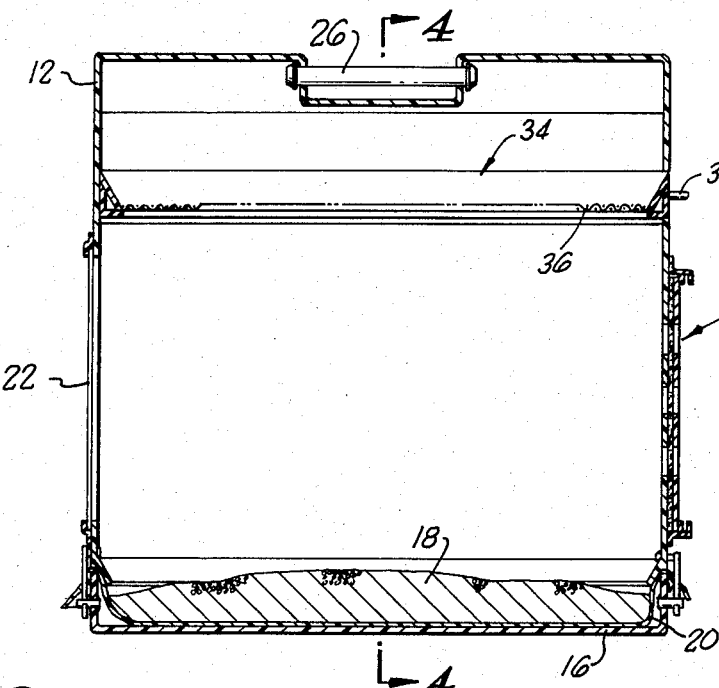
FIG. 3 is a cross-sectional view taken along lines 3—3 of FIG. 2.

Referring more particularly to the drawings, FIG. 1 shows a housing 12 having a curved upper surface or top 14, and a removable litter tray 16 forming the bottom of the housing. Within the litter tray 16 is the particulate litter 18 which is prevented from actual contact with the litter tray 16 by a plastic sheet 20 which is clamped in place when the housing 12 is set onto the litter tray 16 and the hooks at each end, including the hook 23, are engaged to lock the litter tray 16 to the housing 12. A sliding door 22 mounted in track 24 may be opened or closed to provide access to the interior of the housing 12, or to keep the cat in the housing when confinement is desired.

A handle 26 is provided at the top of the housing to facilitate lifting or carrying the housing, and additional hand holding locations 28 may be provided on both sides of the litter tray 16 to facilitate rotation of the housing as more fully described below.

FIG. 2 is a rear view of the housing 12 showing the filter 30, a second hook clamp 23, and a handle 32 on a removable drawer-like container 34, which is shown in cross section in FIG. 4. More particularly, the removable container 34 includes a bottom 36 made of screen material having a mesh size sufficiently large to permit the particles or granules of litter 18 to drop through it and back down into the litter tray 16.

The removable drawer-like tray 34 has slanted sides 38 in order to direct litter onto this screen 36. Mounting arrangements for the tray 34 may extend from one end of the housing 12 to the other, and include the partitioning and support member 40 on one side of the tray 34, and the support and retaining member 42 on the other side of the container 34. It may be noted that the member 40 extends all the way to the upper surface of the housing 12, while the member 42 is spaced from the housing 12 leaving a substantial space 44 through which the litter may flow, as will be described in greater detail below.

On the second sheet of the drawings, FIG. 3 is a longitudinal cross-sectional view, taken along lines 3—3 of FIG. 2, showing the housing 12, the upper handle 26, the litter tray 16 forming the bottom of the housing, the litter 18, the sliding door 22, as well as the filter 30. Also shown in FIG. 3 is the handle 32 for the drawer-like container 34 having the screen 36 at its bottom.

Figure 5:
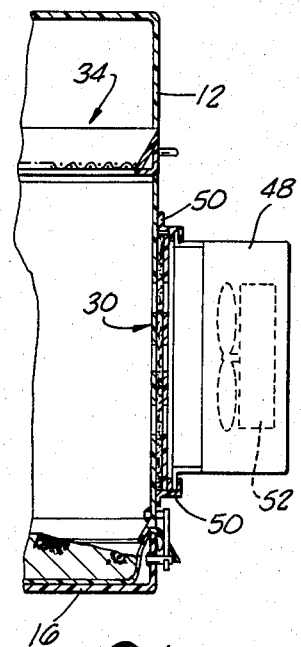
FIG. 5 is a partial transverse view of one end of the housing of FIG. 1, showing a fan mounted in place over the filter.

FIG. 5 shows a housing 48 which is slidably mounted in grooves provided by the brackets 50 which are secured in turn to the housing 12. Within the housing 48 is a fan 52 which may exhaust air outwardly from housing 12 through the filter structure 30. The filter structure 30 may also be mounted in grooves or a track provided in the brackets 50. The fan may be operated either by a set of batteries which may be mounted within housing 48 or may be operated from 110 volt outlets, for which a cord may be provided.

Figures 6A, 6B, 6C:
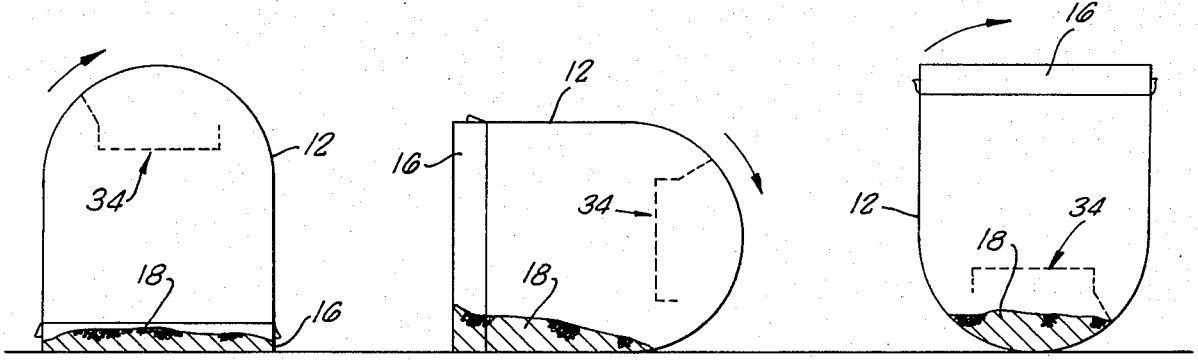
FIGS. 6a through 6e show successive steps in rotating the housing of FIG. 1 through 360 degrees, to cause the litter to flow from the litter tray at the bottom of the housing into the container with a screen bottom, at the top of the housing.
Figures 6D, 6E:
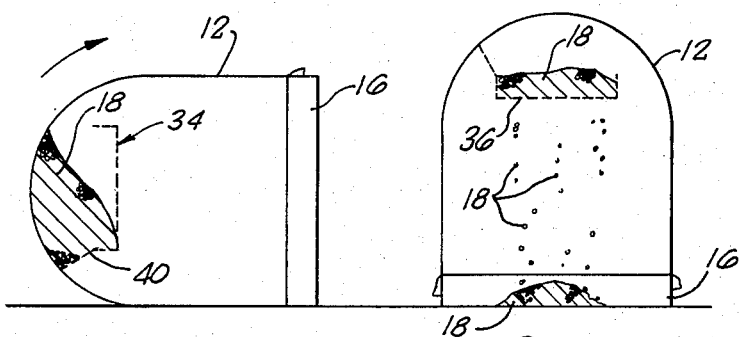

FIGS. 6a through 6e show the processing of the litter 18 by rotation of the housing through 360 degrees, as mentioned generally hereinabove. More specifically, FIG. 6a shows the housing 12 in its normal upright position, with the litter 18 located in the litter tray 16 and with the container 34 at the top of the housing. The first step is shown in 6b when the housing is rolled over onto one side, so that the litter 18 comes at least partially out of the litter tray 16 and lies along the side of the housing 12. The next step is shown in FIG. 6c when the litter is located at the top of housing 12 now that the housing is completely turned upside-down. FIG. 6d shows the entire mass of litter 18 being retained by the container 34 and the partition 40 which extends from the container 34 to the upper sidewall of the housing 12. Finally, as shown in FIG. 6e, the housing 12 has been rolled around to its upright position again, and the litter 18 is being sifted by the screen 36 so that the bulk of the litter drops back down into the litter tray 16.

Incidentally, instead of rolling the housing over, as shown in FIG. 6a through 6e, the unit may be lifted by the handles 26 and 28 and may be rotated entirely in the air, with the same results being obtained. In each case, it is preferred that the sliding door 22 be closed so that the litter 18 will be retained entirely within the housing. As mentioned above, once the particulate litter material has dropped through the screen 36, the residual solid excrement or fecal material will remain on the screen, together with litter associated therewith. The drawer-like container 34 may then be removed by pulling on the handle 32, and the remaining material may be dumped into appropriate recepticle. In the meantime, the litter 18 is available for re-use. To change litter, the litter tray 16 may be unhooked from the remainder of the housing 12, the plastic sheet may be picked up by its edges to contain the litter, and the entire package put into the garbage, with a new sheet of plastic then placed over the litter tray 16 and new litter 18 placed on the sheet.

Incidentally, cat litter is available in particulate form, with the maximum diameter of the particulate material being ¼ inch or less. Using screen mesh 36 having holes approximately ½ of an inch in their maximum dimension, the solid excrement or fecal material will be retained on screen 36 in the container 34, while the bulk of the particulate litter material will drop through the screen.

In conclusion, it is to be understood that the foregoing detailed description and the accompanying drawings relate to one preferred embodiment of the invention. Other arrangements may be employed to implement certain features thereof without departing from the spirit and scope of the invention. Thus, by way of example and not of limitation, other types of mechanical devices may be employed to implement the hooks 23, the handles 26 and 28, the filter 30 (which may include carbonaceous and other air freshening and/or deodorizing components), as well as the container 34. Thus, by way of example but not of limitation, the container 34 may form the top of the housing 12, and may be removable therefrom, instead of using a drawer-type configuration. In addition, while a rounded upper surface for the housing 12 is preferred, it could also have a conventional square configuration. Also, the housing and components may be made of lightweight metal or preferably of plastic. Accordingly, the present invention is not limited to the construction precisely as described hereinabove, and as shown in the accompanying drawings.

What is claimed is:

1. A cat litter disposal system comprising:
   a housing of sufficient size to easily accommodate a cat or other small animal;
   litter storage means included in the bottom of said housing for receiving and storing particulate cat litter;
   a removable container having a screen bottom mounted near but spaced from the top of said housing, said screen having openings slightly larger than the individual particles of the particulate cat litter;
   means for rotating said housing through 360 degrees to move the cat litter from said litter storage means into said removable container; and
   means for mounting said removable container in said housing, said mounting means closing the space between one side of said removable container and said housing, while leaving an open space between the other side of said container and said housing, whereby said litter passes through said open space and is caught in said container as the housing is rotated;
   whereby the bulk of the cat litter falls through said screen, back to said litter storage means, and the fecal matter and associated litter is retained in said removable container.

2. A cat litter disposal system as defined in claim 1 wherein said litter storage means constitutes the bottom of said housing, and means are provided for clamping a sheet of impermeable, flexible, disposable material over the bottom of said housing to facilitate periodic renewal of the entire mass of particulate litter.

3. A cat litter disposal system as defined in claim 1 wherein said housing has a rounded upper surface to facilitate rolling it over.

4. A cat litter disposal system as defined in claim 1 including a door for permitting access by the cat or other small animal into the housing.

5. A cat litter disposal system as defined in claim 1 including air filter means in one wall of said housing to reduce odors from said housing.

6. A cat litter disposal system as defined in claim 1 including fan means for exhausting air from said housing.

7. A cat litter disposal system as defined in claim 5 including fan means for exhausting air from said housing through said filter.

8. A cat litter disposal system as defined in claim 1 including handle means for facilitating carrying and rotating said housing.

9. A cat litter disposal system as defined in claim 8 wherein said handle means are mounted on the top and sides of said housing.

10. A cat litter disposal system comprising:
    a housing of sufficient size to easily accommodate a cat or other small animal;
    litter storage means included in the bottom of said housing for receiving and storing particulate cat litter;
    said housing including a removable container having a screen bottom mounted near but spaced from the top of said housing, said screen having openings slightly larger than the individual particles of the particulate cat litter, the space between one side of said container and one upper side portion of said housing being blocked, and the space between the other side of said container and said housing being open; and means for rotating said housing through 360 degrees to move the cat litter from said litter storage means into said removable container;

whereby the bulk of the cat litter falls through said screen, back to said litter storage means, and the fecal matter and associated litter is retained in said removable container.

11. A cat litter disposal system as defined in claim 10 wherein said litter storage means constitutes a removable bottom of said housing, and means are provided for clamping a sheet of impermeable, flexible, disposable material over the bottom of said housing to facilitate periodic renewal of the entire mass of particulate litter.

12. A cat litter disposal system as defined in claim 10 wherein said housing has a rounded upper surface to facilitate rolling it over.

13. A cat litter disposal system as defined in claim 10 including a sliding door for permitting access by the cat or other small animal into the housing.

14. A cat litter disposal system as defined in claim 10 including air filter means in one wall of said housing to reduce odors from said housing.

15. A cat litter disposal system as defined in claim 14 including fan means for exhausting air from said housing through said filter.

16. A cat litter disposal system as defined in claim 10 including handle means for facilitating carrying and rotating said housing.

17. A cat litter disposal system comprising:

a housing of sufficient size to easily accommodate a cat or other small animal;

litter storage means included in the bottom of said housing for receiving and storing particulate cat litter, said litter storage means constituting a removable bottom of said housing;

a removable container having a screen bottom mounted near but spaced from the top of said housing, said screen having openings slightly larger than the individual particles of the particulate cat litter; and means for rotating said housing through 360 degrees to move the cat litter from said litter storage means into said removable container;

whereby the bulk of the cat litter falls through said screen, back to said litter storage means, and the fecal matter and associated litter is retained in said removable container;

means for clamping a sheet of impermeable, flexible, disposable material over the bottom of said housing to facilitate periodic renewal of the entire mass of particulate litter;

said housing having a rounded upper surface to facilitate rolling it over;

means for mounting said removable container, said mounting means closing the space between one side of said removable container and said housing, to deflect material onto said screen, while leaving an open space between the other side of said container and said housing, whereby said litter passes through said open space and is caught in said container as the housing is rotated; and handle means for facilitating carrying and rotating said housing.

18. A cat litter disposal system as defined in claim 17 including a sliding door for permitting access by the cat or other small animal into the housing.

19. A cat litter disposal system as defined in claim 17 further comprising filter means and fan means removably mounted on one side wall of said housing for exhausting and purifying air from said housing.

* * * * *